No. 851,473. PATENTED APR. 23, 1907.
J. W. YOCHEM.
DASHBOARD HOLDER.
APPLICATION FILED AUG. 31, 1906.
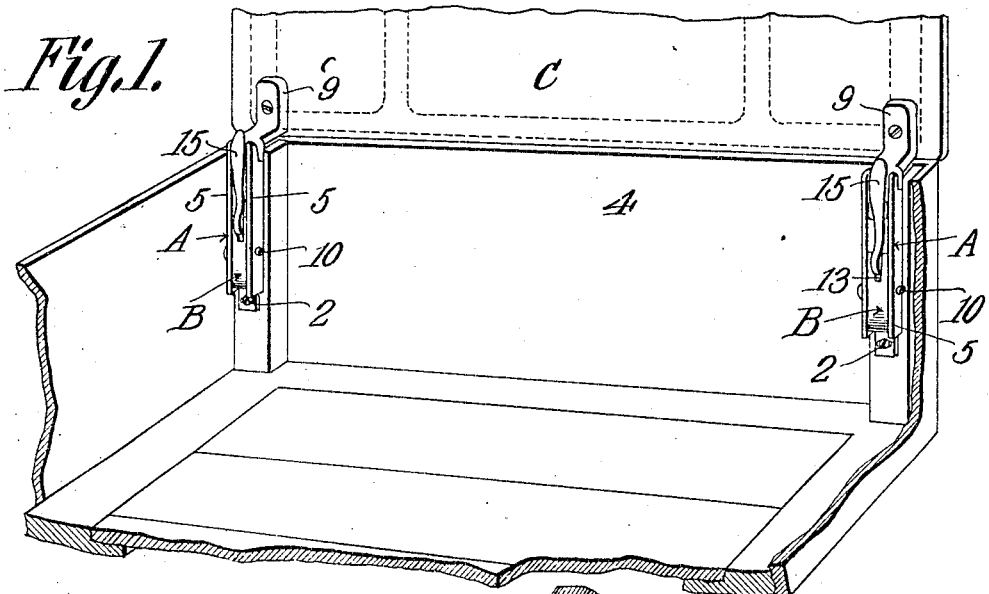
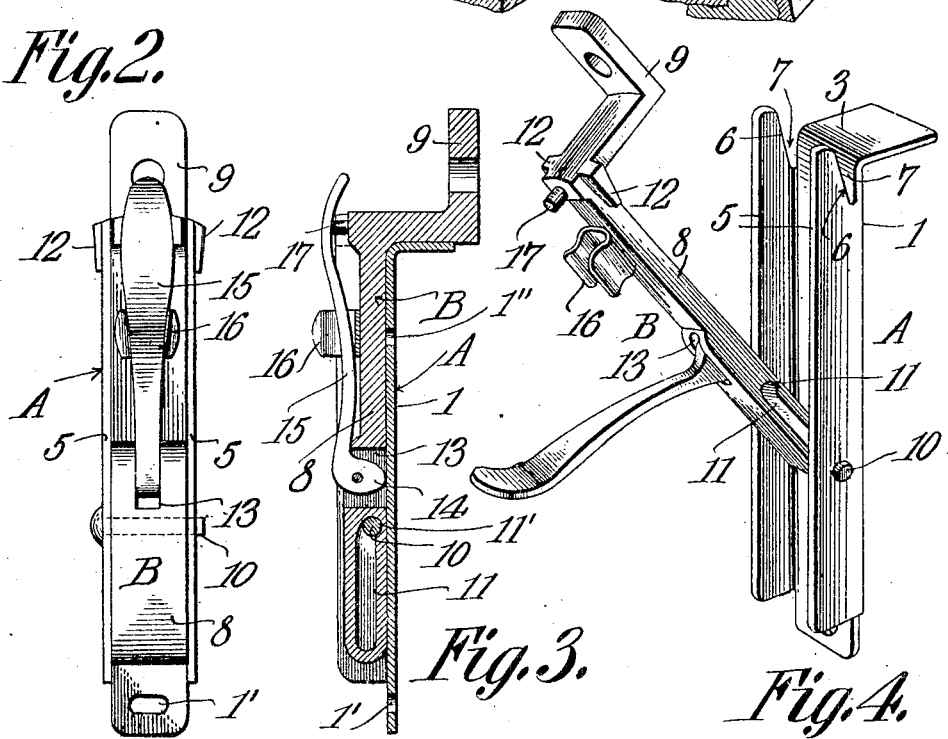
John W. Yochem, INVENTOR.
WITNESSES:
By C. A. Snow & Co.
ATTORNEYS

UNITED STATES PATENT OFFICE.

JOHN W. YOCHEM, OF TIFFIN, OHIO.

DASHBOARD-HOLDER.

No. 851,473.      Specification of Letters Patent.      Patented April 23, 1907.

Application filed August 31, 1906. Serial No. 332,830.

*To all whom it may concern:*

Be it known that I, JOHN W. YOCHEM, a citizen of the United States, residing at Tiffin, in the county of Seneca and State of Ohio, have invented a new and useful Dashboard-Holder, of which the following is a specification.

This invention relates to dashboard holding devices of the general type set forth in my United States Patent No. 802,543, dated October 24, 1905.

The objects of the present invention are to improve, strengthen and simplify the construction of such devices; furthermore, to increase their efficiency in operation and to decrease the expense attending their manufacture.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of the following claims without departing from the spirit of the invention or sacrificing any of its advantages.

In the accompanying drawings forming part of this specification: Figure 1 is a perspective view, partly broken away, of the forward end of a vehicle body, having a dashboard held in position by means of the improvements of the present invention; Fig. 2 is a rear elevation of one of the improved dashboard holders; Fig. 3 is a vertical longitudinal section thereof; and Fig. 4 is a transverse view showing the holder in open position.

Like reference numerals indicate corresponding parts in the different figures of the drawings.

The improved device of this invention comprises a stationary member indicated generally by A, and a movable member indicated generally by B. The stationary member A preferably consists of a plate 1 which is adapted to be secured to the body of a vehicle adjacent the dashboard C thereof. The plate 1 may be secured in position in any suitable manner such, for example, as by means of the screws or bolts 2, and the upper end of said plate preferably is angularly bent, as indicated at 3, to fit over the upper edge of the buggy box or other suitable portion of a vehicle, indicated by 4. The plate 1 of the stationary member A is provided with longitudinally extending side flanges 5 which extend at their upper ends beyond the upper end of the plate 1 and are cut away in any suitable manner to form inclined cam shoulders 6. As shown in the drawing, the upper end of the plate 1, adjacent the angularly bent portion 3, co-operates with the lower ends of the inclined cam shoulders 6 to form an approximately wedge-shaped slot 7.

The movable member B preferably consists of a bar 8 which is adapted to support the dashboard C, said bar preferably being formed with an angularly extending portion 9 which is bolted or otherwise suitably secured to the dashboard C and is adapted to rest upon the angularly bent upper end of the plate 1 when the dashboard is in position. The movable member B, consisting of the bar 8, preferably has a sliding pivotal connection with the stationary member A. The preferred form of sliding pivotal connection consists of a pivot rod 10 which is connected with the side flanges 5 of the member A and extends through a longitudinal slot 11 formed in the member B, whereby the member B can not only be swung in a pivotal manner upon the member A but can also be moved in a longitudinal direction so as to permit the dashboard C to be swung back upon the buggy body and thus removed out of the way of the thills when it is desired to store the buggy in small space. For the purpose of holding the movable member B in engagement with the member A when the dashboard is in normal position, the member B is provided with interfitting elements in the nature of laterally extending, wedge-shaped lugs 12, which are adapted to fit into the wedge-shaped slots 7 of the member A so as to engage the inclined cam shoulders 6, it being understood that the downward pressure of the dashboard C will cause the wedge-shaped lugs 12 to ride down the inclined cam shoulders 6 and thus cause the bar 8 to be forced tightly against the plate 1 of the member A.

In order to lock the members A and B together in such manner as to prevent longitudinal movement by the member B, said member B is formed with a slot 13 in which is mounted a cam member 14 of a locking device 15, which is so shaped that when it is pushed down into parallelism with the bar 8 of the movable member B, the cam member 14 will bear against the plate 1 of the stationary member A and thus force said members away from each other, this operation being resisted at one end of the bar 8 by the pivot rod 10 and at the other end of said bar by the interfitting elements consisting of the wedge-shaped lugs 12 and the inclined cam shoulders 6. The action of the locking device 15 is therefore not only to prevent any longitudinal movement of the bar 8 with respect to the plate 1 which might serve to permit the interfitting elements 6 and 12 to become disengaged from each other and permit the dashboard C to swing backward, but also to maintain a rigid strained relation between the members A and B which will effectually prevent them from rattling.

For the purpose of holding the locking device 15 in parallelism with the bar 8, a pair of oppositely acting spring clips 16 are mounted upon said bar in such manner as to engage the handle of the locking device 13. A resilient buffer 17, formed preferably of rubber, is interposed between the locking device 15 and the bar 8, as shown.

It will be obvious that by drawing rearwardly upon the handle of the locking device 15, the cam member 14 will be moved out of contact with the plate 1 of the stationary member A so that the movable member B can be raised up until the wedge-shaped lugs or elements 12 become disengaged from the cam shoulders 6, after which the member A, together with the dashboard C, can be swung rearwardly so as to permit the thills to be folded upward against the vehicle body without contacting with the dashboard.

The improved dashboard holder of this invention is strong, simple, durable and inexpensive in construction as well as thoroughly efficient in operation.

As shown in Fig. 3, the slot 11 of the member B is formed at its upper end with a laterally-extending recess 11' into which the pivot rod 10 is adapted to fit when the locking device is in locked position, whereby any accidental longitudinal movement of the member B with respect to the member A is effectually prevented.

The member A at its lower end preferably is formed with an elongated slot 1' adapted to receive a screw or other fastening device so that when the member A is fastened on a vehicle, it can be moved either way to set it in proper vertical position, it being understood that the upper end of the member B is held in position by a fastening extending through the opening 1" shown in Fig. 3.

What is claimed is:

1. A dashboard holder comprising a pair of pivotally connected members, a locking device for forcing said members away from each other to prevent rattling, and spring clips for holding said locking device in locked position.

2. A dashboard holder comprising a pair of members having a sliding pivotal connection with each other, wedge-shaped lugs connected with one of said members, and cam shoulders carried by the other of said members and adapted to be engaged by said wedge-shaped lugs.

3. A dashboard holder comprising a pair of members having a sliding pivotal connection, wedge-shaped lugs connected with one of said members, cam shoulders carried by the other of said members and adapted to be engaged by said wedge-shaped lugs, and a locking device for holding said wedge-shaped lugs in engagement with said cam shoulders.

4. A dashboard holder comprising a member consisting of a plate having side flanges formed with cam shoulders, one end of said plate being extended adjacent said cam shoulders to form a wedge-shaped slot, and a second member consisting of a bar mounted between said side flanges and having a sliding pivotal connection therewith, said bar having wedge-shaped lugs to engage said wedge-shaped slot, a locking device mounted on said bar and having a cam member adapted to engage said plate, spring clips carried by said bar for holding said locking device in locked position, and a resilient buffer mounted between said locking device and said bar.

In testimony that I claim the foregoing as my own, I have hereto affixed my signature in the presence of two witnesses:

JOHN W. YOCHEM.

Witnesses:
E. G. STALEY,
A. W. HAGEN.